(12) United States Patent
Van Dyk et al.

(10) Patent No.: US 6,803,024 B1
(45) Date of Patent: Oct. 12, 2004

(54) BENEFICATION OF TITANIA SLAG BY OXIDATION AND REDUCTION TREATMENT

(75) Inventors: Jacobus Philippus Van Dyk, Pretoria (ZA); Nanne Mattheus Vegter, Pretoria (ZA); Cornelia Petronella Visser, Pretoria (ZA); Thomas De Lange, Pretoria (ZA); John David Winter, Elermore Vale (AU); Ernest Alan Walpole, Lambton (AU); Johannes Nell, Randburg (ZA)

(73) Assignee: Ipcor NV (NL)

( * ) Notice: Subject to any disclaimer, the term of this patent is extended or adjusted under 35 U.S.C. 154(b) by 0 days.

(21) Appl. No.: 09/744,531

(22) PCT Filed: Jul. 27, 1999

(86) PCT No.: PCT/IB99/01326

§ 371 (c)(1),
(2), (4) Date: Jun. 15, 2001

(87) PCT Pub. No.: WO00/06786

PCT Pub. Date: Feb. 10, 2000

(30) Foreign Application Priority Data

Jul. 29, 1998 (ZA) .............................................. 98/6758

(51) Int. Cl.⁷ .......................... C01G 23/00; C22B 34/10
(52) U.S. Cl. .............................. 423/69; 423/82; 423/86
(58) Field of Search .............................. 423/69, 82, 86, 423/83, 150.3, 150.6; 75/435

(56) References Cited

U.S. PATENT DOCUMENTS

| | | | |
|---|---|---|---|
| 2,680,681 A | 6/1954 | Armant et al. | |
| 3,649,243 A | 3/1972 | Williams et al. | |
| 3,739,061 A | 6/1973 | Stickney et al. | |
| 3,996,332 A | 12/1976 | Elger et al. | |
| 4,038,363 A | 7/1977 | Jarish | |
| 4,038,364 A | 7/1977 | Lailach | |
| 4,097,574 A | 6/1978 | Auger et al. | |
| 4,176,159 A | 11/1979 | Paixao et al. | |
| 4,199,552 A | 4/1980 | Rado | |
| 4,362,557 A | 12/1982 | Elger et al. | |
| 4,416,693 A | * 11/1983 | Tolley | ........................ 423/82 |
| 4,629,607 A | 12/1986 | Gueguin | |
| 4,933,153 A | 6/1990 | Gueguin | |
| 5,063,032 A | 11/1991 | Gueguin | |
| 5,389,355 A | 2/1995 | Gueguin | |
| 5,830,420 A | 11/1998 | Borowiec et al. | |
| 5,885,324 A | 3/1999 | Balderson et al. | |

FOREIGN PATENT DOCUMENTS

| | | |
|---|---|---|
| GB | 1282506 | 7/1972 |
| GB | 2315742 | 2/1998 |
| WO | 9719199 | 5/1997 |
| ZA | 93/5922 | 8/1993 |

OTHER PUBLICATIONS

International Search Report; PCT/IB99/01326; Oct. 6, 1999; M. Bombeke.

* cited by examiner

Primary Examiner—Steven Bos
(74) Attorney, Agent, or Firm—Fish & Richardson P.C.

(57) ABSTRACT

This invention relates to a method of treating titania slag to increase the leachability of impurities from the slag consisting of the steps of sizing the titania slag to a particle size from 75 to 850 μm; oxidizing the sized slag particles at a temperature from about 700° C. to below about 900° C. causing the iron present in the slag to concentrate at the exposed surfaces of the slag particles and/or causing an anatase phase to stabilize in the slag, causing a major portion of the iron in the Fe(II) state to convert to the Fe(III) state, and causing the titanium in the Ti(III) state to be converted to the Ti(IV) state; and reducing the oxidized slag in a reducing atmosphere from about 700° C. to about 950° C. to convert a major portion of the iron in the Fe(III) state to the Fe(II) state. The invention also relates to a method of beneficiating titania slag to increase the $TiO_2$ content thereof wherein the above treated slag is leached with acid.

20 Claims, 5 Drawing Sheets

BENEFICATION OF TITANIA SLAG BY OXIDATION AND REDUCTION TREATMENT

1. FIELD OF THE INVENTION

This invention relates to a method of beneficiating titania slag to a high grade titanium dioxide ($TiO_2$) product. Preferably the product is suitable for use as a feedstock in titanium dioxide pigment production or titanium metal production by means of the chloride process. The invention also relates to a process for preparing intermediate products suitable for use in the beneficiation of titania slag and also to intermediate products and final products formed by the processes.

More particularly the process of the present invention includes the steps of sizing the slag; oxidizing the sized slag and then reducing the oxidized slag. The treated slag may then be subjected to steps such as acid leaching.

2. BACKGROUND OF THE INVENTION

Commercial Uses of $TiO_2$

Titanium is widely known for its use as a metal, but the primary use of titanium is in the form of titanium dioxide ($TiO_2$). $TiO_2$ is used as a white pigment in paints, plastics and paper. Two types of pigment with a tetragonal crystal structure are produced, namely rutile and anatase. Rutile is preferred in outdoor paints and anatase is preferred in indoor paints.

$TiO_2$ Pigment Production

There are two commercial processes for the production of $TiO_2$ pigment namely, the sulphate process and the chloride process. A sulphate process plant is easier to operate and monitor than a chloride process plant, and is capable of using feedstock with a relatively low $TiO_2$ content. However, capital costs of a modern sulphate process plant can be higher than that of a chloride process plant of the same pigment capacity. Furthermore there is a higher volume of waste products to be treated and disposed of due to the use of more impure feedstock and the fact that the sulphate used in the process cannot be easily recovered and recycled.

Accordingly the chloride process is a more popular process and is growing in popularity. The feedstock suitable for use in the chloride process usually needs to have a high $TiO_2$ content and needs to contain fewer impurities than those suitable for the sulphate process.

$TiO_2$ Bearing Deposits $TiO_2$ is commonly found in nature in the form of ilmenite (FeO. $TiO_2$) which contains from 40% to 80% $TiO_2$. Most deposits being mined produce concentrates with a $TiO_2$ content between 45% and 67%. Rutile deposits are far more scarce than ilmenite and they contain about 95% $TiO_2$ in crystalline form and are therefore of sufficient quality to be used directly in the chloride process for $TiO_2$ pigment production. Deposits of anatase have been discovered but have not yet been commercially exploited. Anatase typically has a $TiO_2$ content in excess of 95%. Leucoxene, a weathered form of ilmenite, contains up to 85% $TiO_2$ and is exploited on a limited commercial scale. Brookite (rhombic $TiO_2$), perovskite, ($CaTiO_2$), sphene ($CaTiSiO_5$) and geikielite ($MgTiO_3$) also contain titanium.

Beneficiation of Ilmenite

Although natural rutile is suitable for use as a feedstock in the chloride process, the ever. decreasing availability of natural rutile forced chloride process pigment producers to consider other lower grade feedstock. One such alternative is naturally occurring ilmenite. Due to its relatively low $TiO_2$ content several processes have as their aim the upgrading of the $TiO_2$ content of ilmenite.

These processes include:

i) Partial Reduction of the Iron in the Ilmenite.

This process is described in U.S. Pat. Nos. 4,038,364 and 4,199,552. In this process ilmenite is reduced at elevated temperatures to convert iron in the ferric state, (Fe(III)), to the ferrous state, (Fe(II)). This renders the iron more amenable to acid leaching of the ilmenite during upgrading of the ilmenite.

ii) Pre-Oxidation Followed by Partial Reduction of the Iron in the Ilmenite.

In a process described in GB1,225,826 the ilmenite is subjected to an oxidation treatment to convert substantially all the iron to the ferric state. The ore is then reduced to convert the iron back to the ferrous state and metallic state. In the examples of the patent the oxidation is carried out at 870° C. for two hours. The reduction is carried out at 870° C. for five minutes. The ore exhibits the original X-ray diffraction pattern of ilmenite after treatment but is more amenable to acid leaching to upgrade the ilmenite.

iii) Pre-Oxidation Followed by Reduction of the Iron to Metallic State.

U.S. Pat. No. 4,097,574 describes a process whereby ilmenite is subjected to an oxidation treatment to convert the iron in the ilmenite to the ferric state. Reduction treatment is then carried out to reduce the iron to metallic iron. The iron is then removed by leaching thereby to upgrade the ilmenite.

iv) Smelting of the Ore.

Ilmenite ore can also be smelted in the presence of a carbonaceous reducing agent in an electric arc furnace. This process is described in U.S. Pat. No. 2,680,681. Two saleable products result from this namely, high quality pig iron and titania rich slag. The slag typically contains 80–85% $TiO_2$.

Differences Between Ilmenite Ore and Titania Slag

All of the processes listed above are aimed at beneficiating ilmenite or similar titanium ores. None of these processes were applied to titania slag and there are certain fundamental differences between ilmenite ore and titania slag.

i) The first difference is that ilmenite is a naturally occurring titanium bearing ore, while titania slag is produced by electro-smelting of ilmenite in an electric arc furnace.

ii) The second difference can be found in the amount of the main components that are present. Ilmenite typically contains around 50% titanium oxide and around 45% iron oxide. All the titanium is present as Ti(IV) while around 20% of the iron occurs as Fe(III) and the rest is in the Fe(II) state. Titania slag typically contains around 85% titanium oxide and around 10% iron oxide. In this instance the titanium is in the Ti(III) and the Ti(IV) state, while most of the iron is present as Fe(II).

iii) The third difference lies in the respective mineralogical compositions. In ilmenite concentrates the iron and the titanium is organised into hexagonal ilmenite crystals. As-cast titania slag consists of the following four phases:

a) The most abundant phase is a crystalline phase, known as pseudobrookite or the $M_3O_5$ phase. This phase is a solid solution of iron oxide and titanium oxide, with the end members being $(Ti,Fe,Al,Cr,V)_2O_3.TiO_2$ and $(Mg, Mn,Fe)O.2TiO_2$ and can accommodate the main oxidation states of iron and titanium in its structure, namely Fe(II), Fe(III), Ti(III) and Ti(IV);

b) Rutile ($TiO_2$) although not always present in such quantities that allows detection thereof by X-ray diffraction analysis;
c) An amorphous, glassy phase consisting mainly of $SiO_2$, $TiO_2$, FeO, CaO and $Al_2O_3$ and;
d) Finely disseminated metallic iron globules present in the grain boundaries of the rutile crystals and in the silicate-rich glassy matrix.

The pseudobrookite and amorphous glassy phases are characteristic of titania slag and generally do not occur in ilmenite ores. The presence of pseudobrookite and the glassy phases in titania slag may be one of the causes that the processes for beneficiating ilmenite ore are in some cases not applicable to the beneficiation of titania slag. The different compositions of slags may also play a role.

Beneficiation of Titania Slag

Several known processes have as their aim the upgrading of the $TiO_2$ content of titania slag.

These processes can be classified as follows:

i) Chlorination of the Impurities

A process described in U.S. Pat. Nos. 4,629,607; 4,933,153; 5,063,032 and 5,389,355 to upgrade titania slag containing at least one alkaline earth impurity. Firstly the slag is preheated in a fluidized bed reactor in an atmosphere void of oxygen to prevent the oxidation of the Ti(III) present in the slag to Ti(IV). The slag is then contacted with hydrogen chloride gas. This results in the formation of iron and alkaline earth chlorides in the slag. Finally the chlorides that formed during the chlorination treatment are leached with either water or hydrochloric acid.

ii) Salt Roasting

In U.S. Pat. No. 4,038,363 a process for the upgrading of slag is described. The process consists of a roast procedure in the presence of an alkaline salt such as sodium chloride. After the roast procedure the agglomerates that have formed are dispersed with wet grinding. Thereafter the slag is subjected to leaching in either water or a sulphuric acid solution.

iii) Fluxing of the Impurities

Titania slag can also be upgraded by heating the slag in the presence of a glass forming fluxing agent such as phosphorus pentoxide as is described in U.S. Pat. No. 3,996,332. According to South African patent 93/5922 other glass forming agents such as the oxides of sodium, potassium, silicon etc. can also be used. After the fluxing procedure the slag consists of a crystalline rutile phase and a glassy phase that contains most of the impurities present in the slag. Finally the slag is subjected to leaching in a mineral acid to remove the glass phase and associated impurities.

iv) Sulphatising

U.S. Pat. No. 4,362,557 describes a process where the $TiO_2$ content of titania slag is increased in a two stage procedure. Firstly the slag is mixed with an alkaline salt such as sodium carbonate and reacted with either $SO_3$ or mixtures of $SO_2$ and $O_2$ at 700 to 1100° C. Secondly the sulphates that formed during the roasting are leached with either water or hydrochloric acid at room temperature.

v) Oxidation-Reduction Roasting

The process described in patent application PCT/CA96/00767 has as its basis an oxidation roast followed by a reduction roast. The slag is first sized in the range 75–850 $\mu$m and is then oxidised at a temperature of at least about 950° C., but preferably between 1000 and 100° C., for at least 20 minutes. The oxidation procedure converts the Fe(II) and Ti(III) present in the slag to Fe(III) and Ti(IV) respectively and aims to decompose the glassy phase. After the oxidation the slag is reduced at a temperature of at least about 700° C., but preferably between 800 and 850° C., for at least 30 minutes, but preferably for a period of 1,5 to 2 hours, to convert the Fe(III) in the slag back to Fe(II). A MgO rich ilmenite-geikielite solid solution forms during the process, which is more amenable to leaching than the original phases present in the slag. The roasted titania slag is then leached under pressure in excess of atmospheric pressure and at a temperature of at least 125° C. to remove the impurities present in the slag.

Patent application PCT/CA96/00767 referred to in the above paragraph also stresses the differences between the treatment of ilmenite and titania slag. In example 12 the application illustrates that the process of GB 1,225,826 relating to the treatment of ilmenite (as discussed Add, above) is not suitable when applied to titania slag. As in the case of the process of PCT/CA96/00767, the process of GB1,225,826 includes an oxidation and subsequent reduction treatment. However, negligible removal of impurities are achieved when the process of GB1,225,826 is applied to slag, that is by oxidizing the slag with air at 850° C. for 2 hours and then reducing it with smelter gas at 850° C. for 5 minutes and thereafter leaching the resulting product with a hydrochloric acid solution under reflux conditions. Even if the process is modified by carrying out the oxidation at 900° C. for 1 hour and the reduction at 900° C. for 30 minutes (as set out in example 13 of PCT/CA96/00767) very poor results are achieved.

Patent application PCT/CA96/00767 teaches that the titania slag requires a pre-treatment within an unexpected window of process conditions to render it suitable for acid leaching. The patent describes much harsher oxidation, reduction and acid leaching steps for slag than the conditions for ilmenite as disclosed in the related process of GB 1,225,826.

Most surprising it has now been found that if titania slag is oxidized at a lower temperature than that described in patent application PCT/CA96/00767 under the correct conditions and thereafter reduced and further treated, the slag can be suitably upgraded. In some embodiments of the invention it is not necessary to carry out the leaching at above atmospheric pressure. Leaching at a pressure above atmospheric pressure is required in the process of PCT/CA96/00767. It will be appreciated that even if leaching at above atmospheric pressure may not be necessary for the successful beneficiation of titania slag according to the invention, the process will also function if acid leaching is carried out at above atmospheric pressure.

Patent application PCT/CA96/00767 teaches that during that process the iron cations tend to concentrate around pores formed in the slag particles which will render them more accessible to leaching. It is believed that if the oxidation step is carried out at lower temperatures as disclosed for the present invention the iron in the slag particles surprisingly migrates to the rims of the slag particles. It is believed that such slag particles undergo rapid reduction roasting and that such slag particles are more amenable to acid leaching which allows leaching to be conducted at atmospheric pressure.

3. SUMMARY OF THE INVENTION

According to the present invention a method of treating titania slag to increase the leachability of the slag comprises the steps of sizing the titania slag to a particle size from 75 to 850 $\mu$m;

oxidizing the sized slag particles in an oxidizing atmosphere at a temperature from about 700° C. and above but below about 950° C. for at least 30 minutes allowing the iron present in the slag to concentrate at the exposed surfaces of the slag particles, allowing a major portion of the iron in the Fe(II) state to convert to the Fe(III) state, and allowing the titanium in the Ti(III) state to be converted to the Ti(IV) state; and reducing the oxidized slag in a reducing atmoshpere from about 700° C. to about 950° C. for at least 5 minutes to convert a major portion of the iron in the Fe(III) state to the a FE(II) state without converting a substantial amount of the titanium in the Ti(IV) state to the Ti(III) state.

According to another aspect of the present invention a method of treating titania slag to increase the leachability of the slag comprises the steps of sizing the titania slag to a particle size from 75 to 850 μm;

oxidizing the sized slag particles in an oxidizing atmosphere at a temperature from about 700° C. and above but below about 950° C. for at least 30 minutes allowing an anatase phase to stabilize in the slag, allowing a major portion of the iron in the Fe(II) state to convert to the Fe(III) state, and allowing the titanium in the Ti(III) state to be converted to the Ti(IV) stage; and reducing the oxidized slag in a reducing atmosphere from about 700° C. to about 950° C. for at least 5 minutes, to convert a major portion of the iron in the Fe(III) state to the Fe(II) state and without converting a substantial amount of the titanium in the Ti(IV) state to the Ti(III) stage.

The titania slag includes a pseudobrookite phase and a glassy phase. The glassy phase may consist mainly of $SiO_2$, $TiO_2$, FeO and $Al_2O_3$.

The titania slag may contain titanium oxide and impurities including at least one compound selected from the group consisting of iron oxide, silicon oxide, aluminium oxide, alkaline earth oxide, manganese oxide, chromium oxide and vanadium oxide. The titanium oxide and impurities may be provided in a pseudobrookite phase and a glassy phase. The alkaline earth oxide may comprise calcium oxide and/or magnesium oxide.

The titania slag is preferably crushed and preferably to a particle range of above 106 μm up to 850 μm.

During the oxidation step the iron present in the slag preferably concentrates at the exposed surfaces of the slag, and an anatase phase is allowed to stabilize in the slag.

The oxidation is preferably carried out at a temperature from about 750° C. and above but preferably below about 900° C. and more preferably is carried out at a temperature from about 800° C. to about 875° C.

The oxidation is carried out for longer than 30 minutes. Preferably it is carried out for a period of about 2 hours.

The oxidation is preferably carried out in a fluidized bed reactor.

The oxidizing atmosphere may comprise oxygen diluted by an inert gas (preferably a mixture of $Co_2$ and $N_2$) containing at least 2% oxygen by volume. More preferably the atmosphere results from the combustion of a carbonaceous fuel with excess air. Most preferably the oxidizing atmosphere contains between 4% and 8% oxygen by volume.

Preferably more than 60%, preferably more than 75%, more preferably more than 90% and most preferably substantially all the iron in the Fe(II) state is converted to the Fe(III) state during oxidizing of the slag. The reduction is preferably carried out at a temperature between about 800° C. and about 875° C.

The reduction is preferably carried out in a fluidized bed reactor.

The reducing atmosphere may be supplied by any one of the following reducing agents: carbon monoxide gas, hydrogen gas, gases such as reformed natural gas and smelter off gas and mixtures between these gases. More preferably the reducing atmosphere is supplied by the products resulting from combustion of coal.

The reduction is preferably carried out for a period of longer than 10 minutes and less than 1 hour. More preferably it is carried out for a period of 20 minutes.

Preferably more than 60%, preferably more than 75%, more preferably more than 90% and most preferably substantially all iron in the Fe(III) state is converted to the Fe(II) state during reduction.

Most preferably, none of the titanium in the Ti(IV) state is converted to the TI(III) state during reductions.

According to another aspect of the invention there is provided a method of beneficiating titania slag to increase the $TiO_2$ content thereof comprising the steps of:

sizing the titania slag to a particle size from 75 to 850 μm;

oxidizing the sized slag particles in an oxidizing atmosphere at a temperature from about 700° C. and above but below about 950° for at least 30 minutes allowing the iron present in the slag to concentrate at the exposed surfaces of the slag particles, allowing a major portion of the iron in the Fe(II) state to convert to the Fe(III) state, and allowing the titanium in the Ti(III) state to be converted to the Ti(IV) state;

reducing the oxidized slag in a reducing atmosphere from about 700° C. to about 950° C. for at least 5 minutes to convert a major portion of the iron in the Fe(III) state to the Fe(II) state and without converting a substantial amount of the titanium in the Ti(IV) state to the Ti(III) state; and leaching the reduced slag with acid to obtain a beneficiated slag product with an increased $TiO_2$ content and leach liquor containing the leached impurities.

According to another aspect of the invention there is provided a method of beneficiating titania slag to increase the $TiO_2$ content thereof comprising the steps of:

sizing the titania slag to a particle size from 75 to 850 μm;

oxidizing the sized slag particles oxidizing atmosphere at a temperature from about 700° C. and above but below about 950° C. for at least 30 minutes, allowing an anatase phase to stabilize in the slag, allowing a major portion of the iron in the Fe(II) state to convert to the Fe(III) state, and allowing the titanium in the Ti(III) state to be converted to the Ti(IV) state;

reducing the oxidized slag in a reducing atmosphere from about 700° C. to about 950° C. for at least 5 minutes to convert a major portion of the iron in the Fe(III) state to the Fe(II) state and without converting a substantial amount of the titanium in the Ti(TV) state to the Ti(III) state; and leaching the reduced slag with acid to obtain a beneficiated slag product with an increased $TiO_2$ content and leach liquor containing the leached impurities.

The leaching may be conducted under pressure in excess of atmospheric pressure. Alternatively the leaching may be conducted at atmospheric pressure. Alternatively, a combination of atmospheric and pressure leaching may be used.

The acid may be heated and preferably the acid is heated to the boiling point of the acid.

The acid may comprise a mineral acid and preferably it comprises sulphuric acid or hydrochloric acid, more preferably hydrochloric acid.

The acid may be present in at least a 10% stoichiometric excess of what is needed to convert leachable oxides and alkaline impurities to soluble chlorides.

The acid leaching may be done in one or more stages. If more than one stage is used then the leaching may be done in co-current or counter-current mode.

The leaching may be done in batch or continuous mode.

The method of beneficiating titania slag may optionally include a caustic leaching step after the acid leaching step.

Optionally the method includes calcination of the treated slag. Prior to calcining the treated slag it may be washed and it may be dried to remove volatile by-products. The drying step may be carried out at a temperature above 100° C.

The calcination may be carried out by heating the product between 600° C. and 900° C. for more than 30 minutes.

The method may also include an additional step of subjecting the calcined slag to a magnetic separation procedure.

The methods of beneficiating the titania slag is preferably performed to form beneficiated titania slag suitable for use as a feedstock for the chloride process of $TiO_2$ pigment production.

The beneficiated titania slag may contain at least 90% by weight, preferably at least 94% by weight of titanium dioxide. Preferably it contains less than 1,5%, preferably less than 1% by weight of magnesium oxide. Preferably it contains less than 0,4% by weight of calcium oxide.

The invention also relates to products formed by the methods described herein above.

According to another aspect of the invention there is provided treated titania slag containing rutile, anatase and pseudobrookite.

According to yet another aspect of the present invention there is provided treated titania slag including rutile, anatase, ilmenite and pseudobrookite.

4. BRIEF DESCRIPTION OF THE DRAWINGS

Preferred embodiments of the invention will now be described by way of example only and with reference to the accompanying drawings wherein.

DETAILED DESCRIPTION OF THE INVENTION

As described above titania slag is formed by smelting ilmenite ore in an electric arc furnace to form pig iron and titania rich slag. The titania rich slag is cast in a molten state into ladles whereby solid blocks are produced ranging from a few tons to as much as forty tons. Titania slag mainly consists of a pseudobrookite solid solution phase also known as the $M_3O_5$ solid solution. The solid solution phase with general formula $(Fe^{2+}, Mg^{2+}, Mn^{2+}, Ti^{4+}, Ti^{3+})_3 O_5$ contains iron in the Fe(II) state, titanium in the Ti(III) and (IV) states. Potentially it can also contain iron in the Fe(III) state but then titanium in the Ti(III) state will not be present. Chemically the $M_3O_5$ phase contains 81 to 91% $TiO_2$ and between 5% and 13% FeO. The $M_3O_5$ phase occurs as fine to coarse grained, angular to sub-rounded greyish coloured particles with a smooth appearance. Small amounts of a silicate-rich glass can also be found, situated at the grain-and crystal boundaries of the individual $M_3O_5$ crystals. This glass contains a second silicate-enriched glass. The silicate-enriched glassy phase has a smooth appearance and contains finely disseminated metallic iron spheroids and droplets. The major glassy phase is fine crystalline, containing fine needle-like titanium oxide crystallites as well as fine metallic iron particles and coarser-grained "globules". The larger metallic "globules" are characterized by an iron sulphide-containing outer rim. In most instances the slag may also contain small amounts of rutile.

Table 1 shows the chemical composition of a typical titania slag that is used as feedstock to the process described in this invention. This table shows that the main impurity present in the slag is iron.

TABLE 1

Chemical composition of a typical titania slag, in mass percentage, used as feedstock to the process described in the current invention.

| $Fe^0$ | FeO | $Fe_2O_3$ | $Ti_2O_3$ | $TiO_2$ | $SiO_2$ | $Al_2O_3$ | CaO | MgO | MnO | $Cr_2O_3$ | $V_2O_5$ |
|---|---|---|---|---|---|---|---|---|---|---|---|
| 0.21 | 7.65 | <0.1 | 34.20 | 50.70 | 1.64 | 0.99 | 0.31 | 1.42 | 1.32 | 0.15 | 0.41 |

Figure 1:
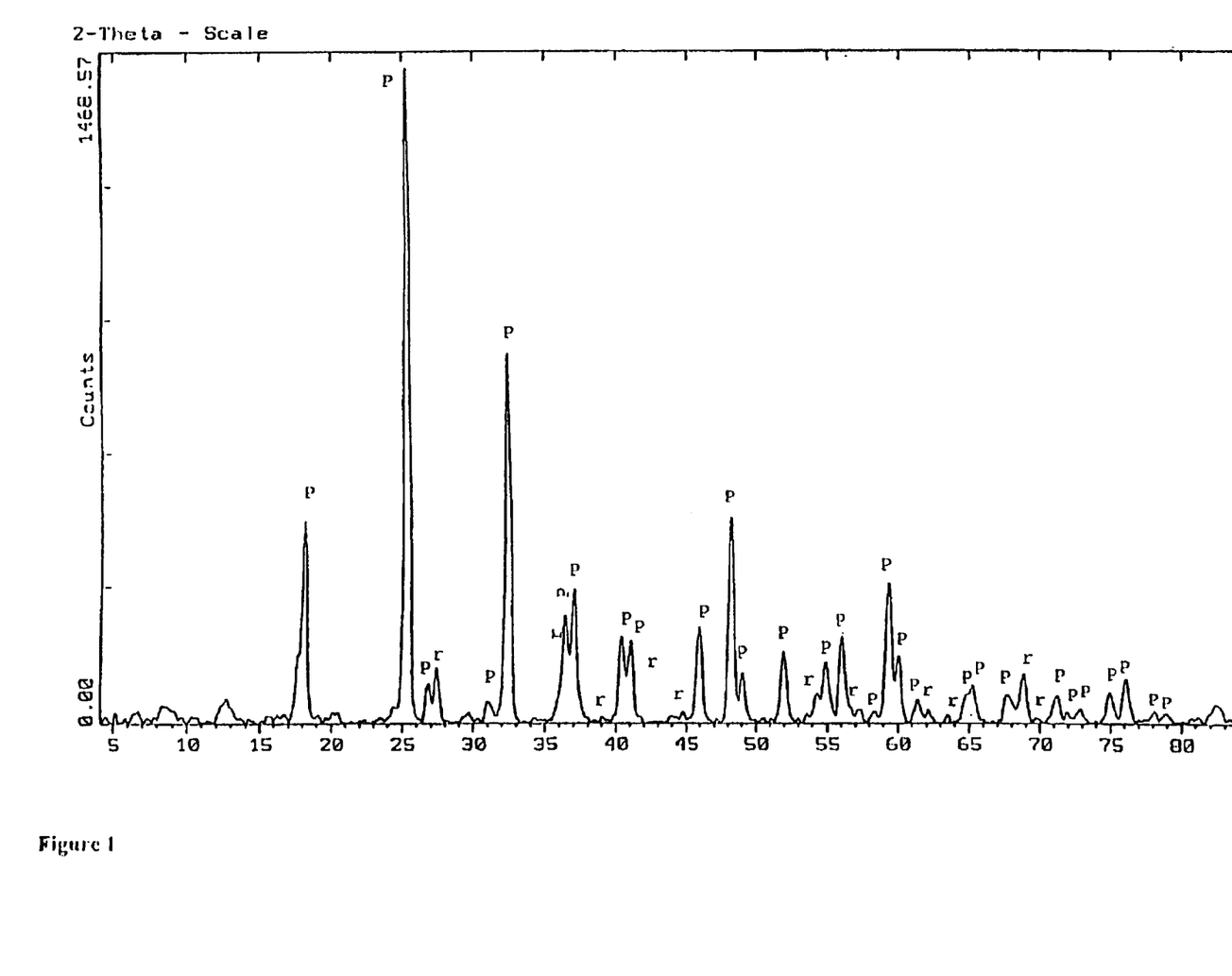
FIG. 1 is a X-ray diffraction pattern of as-cast titania slag.

A typical X-ray diffraction pattern of the titania slag feedstock is presented in FIG. 1. This shows: i) a main pseudobrookite peak (P) taken at a d-spacing of 3.483 Å to 3.52 Å and a 2θ angle from 25.553° to 25.280° for Cu Kα radiation. In this specific instance rutile is present, and exhibits a main peak (r) taken at a d-spacing of 3.247 Å and a 2θ angle of 27.445° for Cu Kα radiation. In other cases rutile is not always present.

The slag is not amenable to acid leaching for removing impurities to form a $TiO_2$ rich upgraded slag. Accordingly the slag requires pre-treatment to render it amenable to acid leaching. The beneficiation process of titania slag accordingly includes the following steps:-

Crushing and Sizing the Titania Slag

The blocks of titania slag are crushed and sized using conventional methods and preferably the slag is sized in the +106–850 μm particle size range which is acceptable in the chloride process for $TiO_2$ pigment production.

Oxidation of the Sized Titania Slag

The crushing and sizing of the titania slag is followed by an oxidation procedure. This is conducted by reacting the sized slag at a temperature between 700° C. and 950° C., preferably between 800° C. and 875° C. with an oxidizing atmosphere for ½ to 4 hours. A fluid bed reactor is preferred for this procedure, while the oxidizing gas is preferably oxygen diluted by an inert gas (such as $N_2$) to levels containing between 2% and 12% $O_2$.

Figure 5:
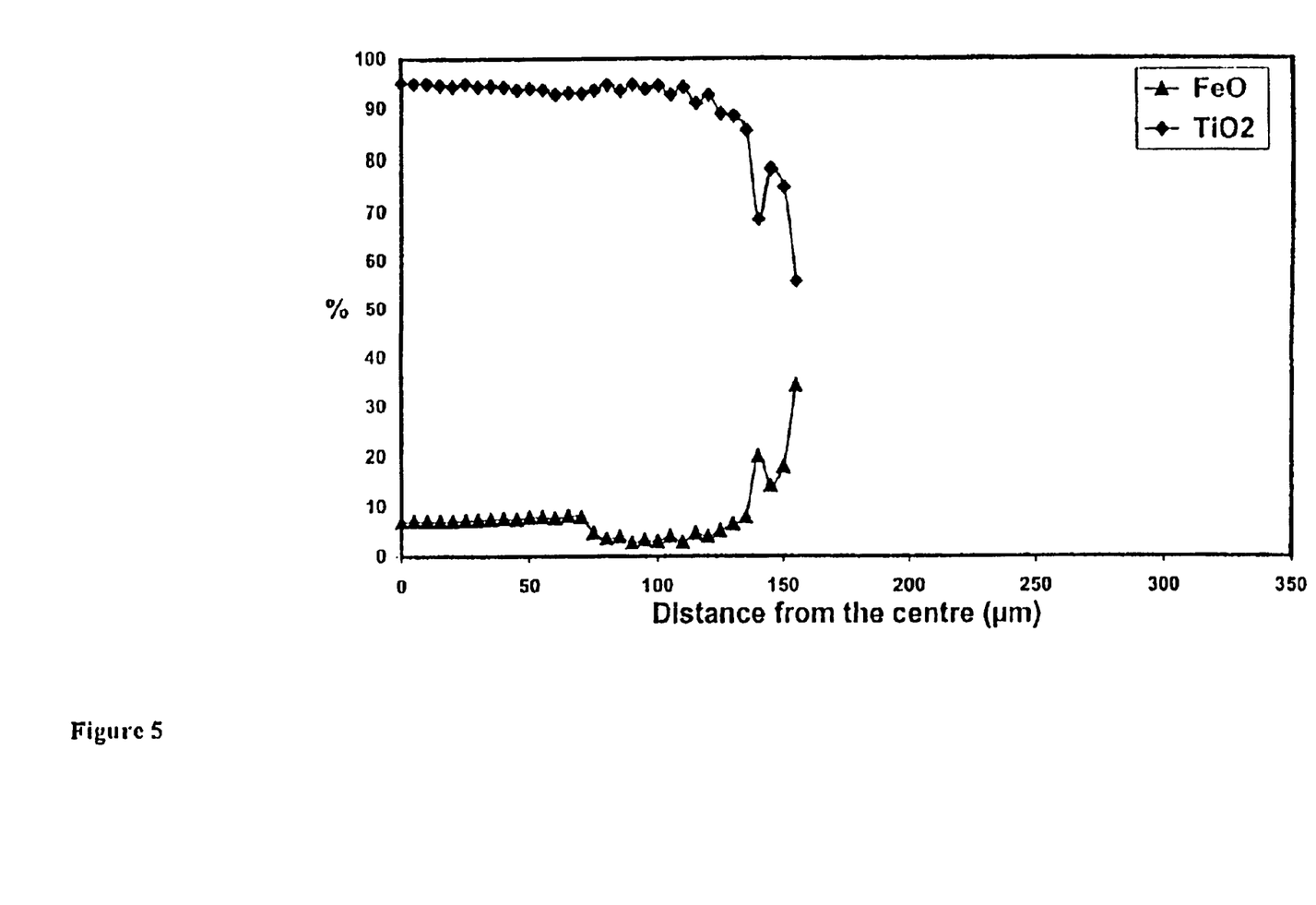
FIG. 5 is a chemical composition profile through a titania slag particle oxidized for 1 hour at 850° C. in 8% oxygen.

An optical microscopic investigation conducted on polished blocks of the oxidized samples revealed that major changes in the general appearance, as well as mineralogical composition of the as-cast slag occurred during the oxidation process. Pores formed and slag particles lost their "smooth" appearance to become zoned. Some of the larger particles had unoxidized $M_3O_5$ cores surrounded by a $TiO_2$-rich intermediate zone. Most of the smaller particles were transformed to $TiO_2$. The $TiO_2$ phases that formed were a mixture of anatase and rutile. On the outside edges of all the particles were iron-enriched, slightly porous marginal zones. FIG. 5 provides evidence of the iron enriched outside edge. Limited iron migration towards the edges of cracks also occurred. Inside the unoxidized $M_3O_5$ cores of the slag particles fine metallic iron particle, situated at the edges of fine cracks extending through the slag particles, could be observed. Most of the iron is converted to the Fe(III) state and all of the titanium is present in the Ti(IV) state.

An advantage of segregation of iron towards the outer surface of the slag particles include rapid reduction roasting and ready access of the impurities to the leach solution and their rapid selective leaching.

Figure 2:
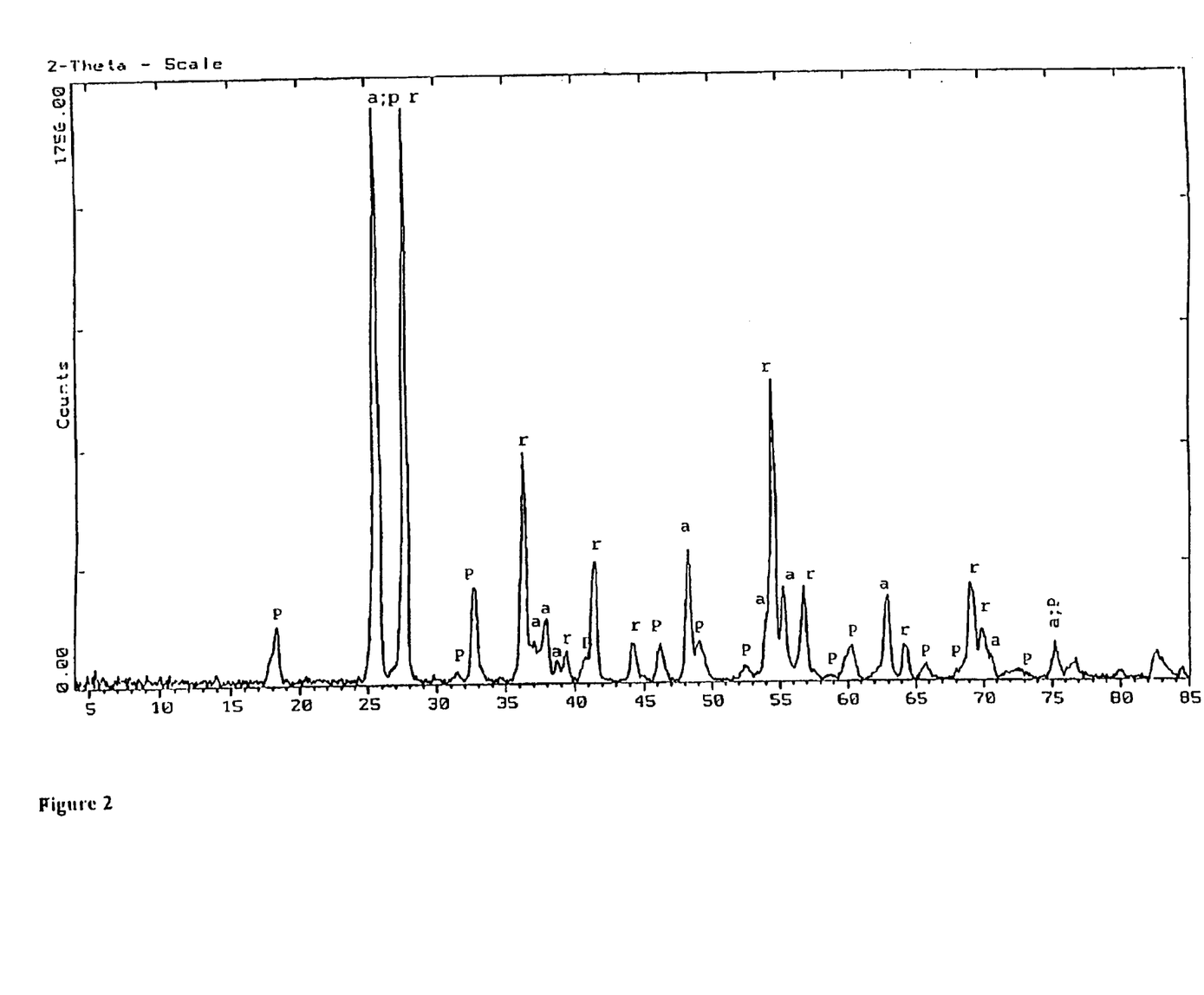
FIG. 2 is a X-ray diffraction pattern of oxidized titania slag.

FIG. 2 shows a typical X-ray diffraction pattern for titania slag after it was subjected to the oxidation procedure. This shows:

i) a main rutile peak (r) at a d-spacing of 3.247 Å and a 2θ angle of 27.445° for Cu Kα radiation;
ii) a main anatase peak (a) taken at a d-spacing of 3.52 Å and a 2θ angle of 25.279° for Cu Kα radiation; and
iii) a minor pseudobrookite peak (P) taken at a d-spacing of 3.483 Å to 3.497 Å and a 2θ angle from 25.553° to 25.449° for Cu Kα radiation.

Reduction of the Oxidized Titania Slag

The next step is to reduce the oxidized slag. This is conducted by contacting the oxidized slag particles with a reducing agent at a temperature from about 700° C. to about 950° C., preferably between about 800° C. and about 875° C., preferably in a fluidized bed reactor. The reduction is carried out for a period of at least 20 minutes.

The reducing agent may comprise any suitable conventional reducing agent such as carbon monoxide, hydrogen, natural gas etc. or a combination thereof. Preferably it comprises the gaseous products that result from the combustion of coal.

The general optical appearance of the slag particles after reduction is very similar to those of the oxidized products except that the iron enriched outer rims of the particles are converted to ilmenite. Some of the particles can be coated with a thin layer of carbon. Most, but not all of the iron is converted to the Fe(II) state and only a very small portion of the titanium is converted to the Ti(III) state.

Figure 3:
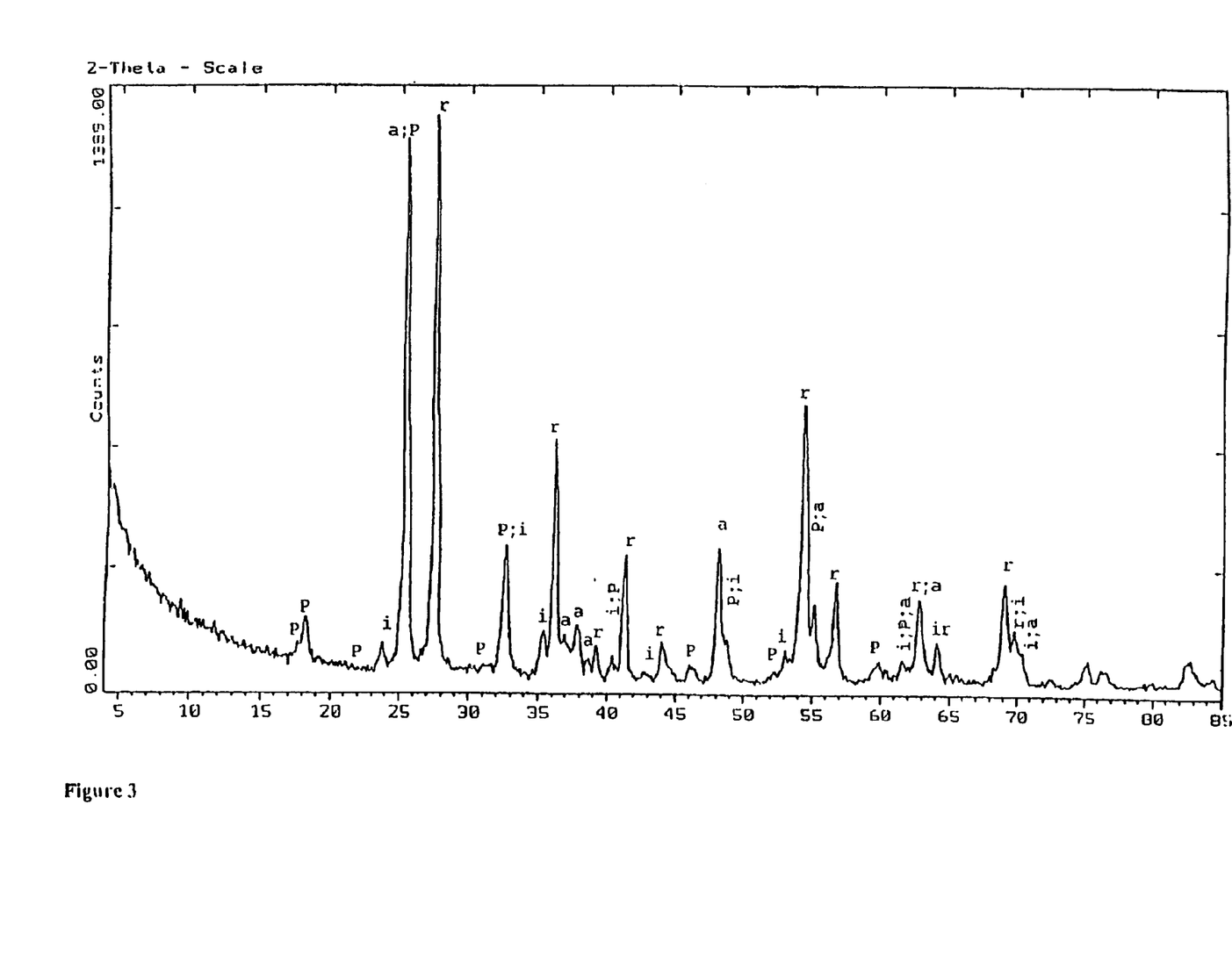
FIG. 3 is a X-ray diffraction pattern of oxidized and reduced titania slag.

A typical X-ray diffraction pattern of titania slag that was oxidized and reduced is presented in FIG. 3. This shows:

i) a main rutile peak (r) at a d-spacing of 3.247 Å and a 2θ angle of 27.445° for Cu Kα radiation;
ii) a main anatase peak (a) taken at a d-spacing of 3.52 Å and a 2θ angle of 25.279° for Cu Kα radiation;
iii) a minor ilmenite peak (i), taken at a d-spacing of 2.754 Å and a 2θ angle of 32.483° for Cu Kα radiation; and
iv) a minor pseudobrookite peak (P) taken at a d-spacing of 3.483 Å to 3.497 Å and a 2θ angle from 25.553° to 25.449° for Cu Kα radiation.

Leaching of the Reduced Titania Slag

After the oxidation and reduction roast the slag is leached in 20 wt % hydrochloric acid at the boiling point of the acid at atmospheric pressure or at elevated pressure. The solids are contacted with an excess of acid required to dissolve the iron and other impurity oxides. The time required for leaching will be dictated by the slag composition and the temperature used for the reaction. Optically, the leached residue displays a weathered appearance compared to the oxidized as well as reduced products. The effect of leaching is most prominent along the outer margins of the slag particles as well as along cracks extending into the individual slag particles.

Table 2 gives the chemical composition of the beneficiated titania slag. This shows that most of the impurities have been removed from the slag and that it now conforms to the ideal specification of the chloride process.

TABLE 2

The chemical composition of the beneficiated titania slag, in mass percentage

| $TiO_2$ | FeO | $SiO_2$ | $Al_2O_3$ | CaO | MgO | MnO | $Cr_2O_3$ | $V_2O_5$ |
| --- | --- | --- | --- | --- | --- | --- | --- | --- |
| 94.10 | 1.54 | 1.84 | 0.47 | 0.11 | 0.55 | 0.37 | 0.10 | 0.33 |

Figure 4:
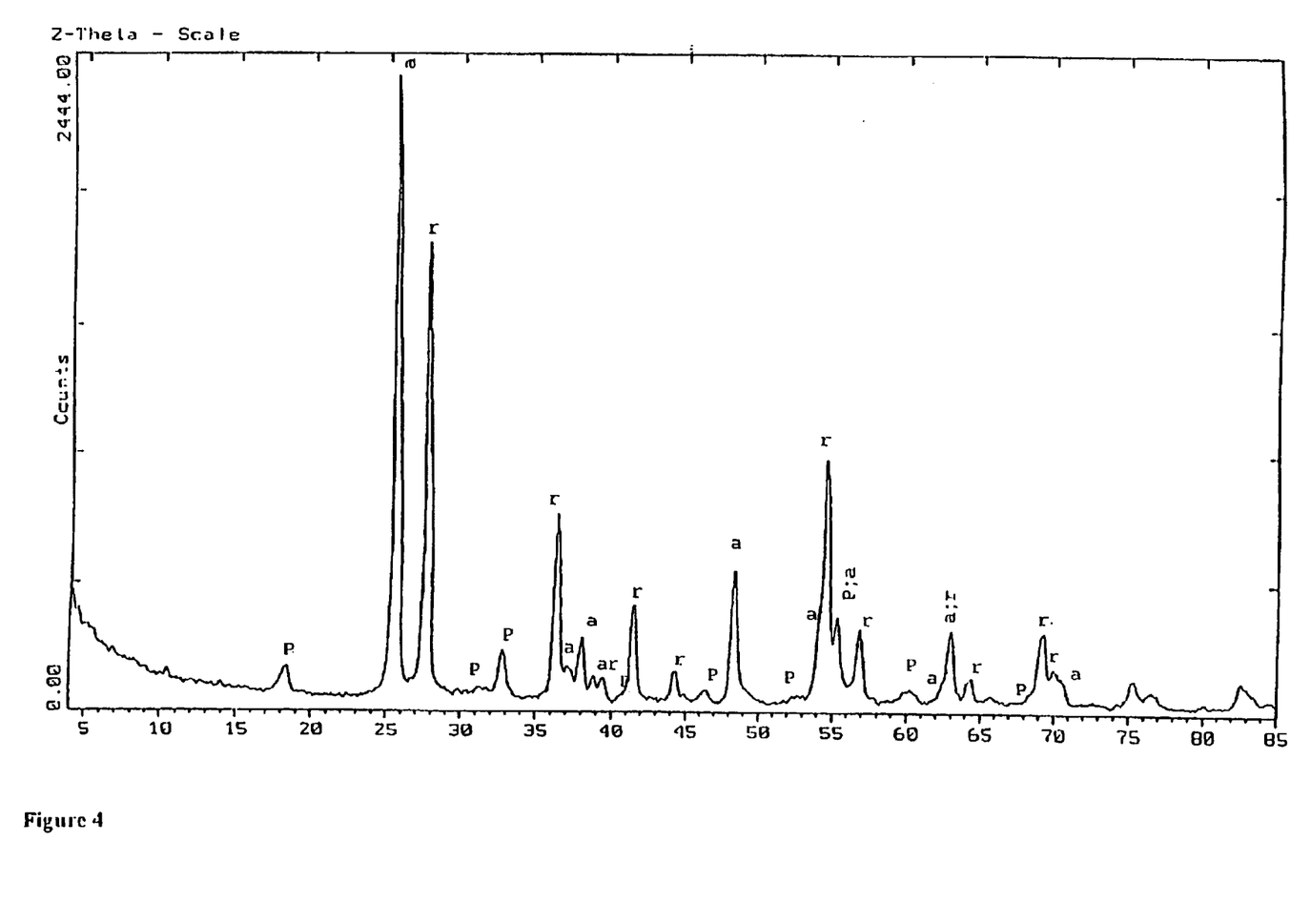
FIG. 4 is a X-ray diffraction pattern of oxidized and reducted titania slag after leaching.

FIG. 4 gives the X-ray diffraction pattern of titania slag after the oxidation, reduction and leach procedures. This shows:

i) a main rutile peak (r) taken at a d-spacing of 3.247 Å and a 2θ angle of 27.445° for Cu Kα radiation;
ii) a main anatase peak (a) taken at a d-spacing of 3.52 Å and a 2θ angle of 25.279° for Cu Kα radiation;
iii) a minor pseudobrookite peak (P) taken at a d-spacing of 3.483 Å to 3.497 Å and a 2θ angle from 25.553° to 25.449° for Cu kα radiation.

Drying of the Leached Titania Slag

Following the leach procedure the leach liquor and titania slag are separated in a solid-liquid separation procedure before the titania slag is washed and then dried at temperatures between 100° C. and 160° C. This removes most of the volatile by-products that resulted from the interaction between the mineral acid and the titania slag.

After drying the beneficiated titania slag product contains more than 90% $TiO_2$, preferably between 93% and 97% $TiO_2$, less than 4% of total iron expressed as FeO and less than 1.2% of the alkaline earth impurities MgO and CaO combined. The main phases present in the beneficiated titania slag are rutile and anatase, while physically only the outside rims of the particles are porous and the bulk of the particles are dense.

6. EXAMPLES

Example 1

Ilmenite from a beach sand deposit was subjected to electro-smelting in a direct current (DC) arc plasma furnace. The composition of the slag produced is presented in Table 3.

TABLE 3

Chemical composition of titania slag in mass percentage

| $TiO_2$ | FeO | $SiO_2$ | $Al_2O_3$ | CaO | MgO | MnO | $Cr_2O_3$ | $V_2O_5$ |
| --- | --- | --- | --- | --- | --- | --- | --- | --- |
| 86.20 | 9.18 | 1.42 | 0.82 | 0.33 | 1.46 | 1.15 | 0.14 | 0.46 |

The slag was broken down by crushing and screened at +106 μm–850 μm. Following this the slag was oxidized in a fluidized bed reactor at 850° C. for 30 minutes in an oxidizing atmosphere comprising a mixture of air and carbon dioxide that set the oxygen level at 8%. Thereafter it was reduced in the same reactor at 850° C. for 20 minutes in a reducing atmoshpere comprising chemically pure carbon monoxide. The roasted slag was then leached in boiling 20% hydrochloric acid at atmospheric pressure for 12 hours. At the conclusion of the leach procedure the leach solution was decanted and the solids were washed and dried at 150° C. The composition of the beneficiated titania slag is given in Table 4.

TABLE 4

Composition of beneficiated titania slag in mass percentage

| $TiO_2$ | FeO | $SiO_2$ | $Al_2O_3$ | CaO | MgO | MnO | $Cr_2O_3$ | $V_2O_5$ |
|---|---|---|---|---|---|---|---|---|
| 94.80 | 2.60 | 1.22 | 0.72 | 0.06 | 0.73 | 0.62 | 0.09 | 0.73 |

Example 2

The same slag as in Example 1 was broken down by crushing and screened at +106 μm–850 μm. Following this the slag was oxidized in a fluidized bed reactor at 950° C. for 120 minutes in an oxidizing atmosphere comprising a mixture of air and carbon dioxide that set the oxygen level at 8%. Thereafter it was reduced in the same reactor at 950° C. for 20 minutes in a reducing atmosphere comprising chemically pure carbon monoxide. The roasted slag was then leached in boiling 20% hydrochloric acid at atmospheric pressure for 12 hours. At the conclusion of the leach procedure the leach solution was decanted and the solids were washed and dried at 150° C. The composition of the beneficiated titania slag is given in Table 5.

TABLE 5

Composition of beneficiated titania slag in mass percentage

| $TiO_2$ | FeO | $SiO_2$ | $Al_2O_3$ | CaO | MgO | MnO | $Cr_2O_3$ | $V_2O_5$ |
|---|---|---|---|---|---|---|---|---|
| 92.10 | 3.99 | 1.26 | 0.77 | 0.32 | 0.96 | 0.50 | 0.12 | 0.43 |

Example 3

Ilmenite from a beach sand deposit was smelted in a DC arc plasma furnace. The composition of the slag that was produced is presented in Table 6.

TABLE 6

Chemical composition of titania slag in mass percentage

| $TiO_2$ | FeO | $SiO_2$ | $Al_2O_3$ | CaO | MgO | MnO | $Cr_2O_3$ | $V_2O_5$ |
|---|---|---|---|---|---|---|---|---|
| 69.70 | 24.83 | 3.50 | 0.89 | 0.30 | 1.88 | 1.07 | 0.33 | 0.47 |

The slag was broken down by crushing and screened at +106 μm–850 μm. Following this the slag was oxidized in a fluidized bed reactor at 850° C. for 120 minutes in an oxidizing atmosphere comprising a mixture of air and carbon dioxide that set the oxygen level at 12%. Thereafter it was reduced in the same reactor at 850° C. for 20 minutes in a reducing atmosphere comprising chemically pure carbon monoxide. The roasted slag was then leached in boiling 20% hydrochloric acid at atmospheric pressure for 12 hours. At the conclusion of the leach procedure the leach solution was decanted and the solids were washed and dried at 150° C. The composition of the beneficiated titania slag is given in Table 7.

TABLE 7

Composition of beneficiated titania slag in mass percentage

| $TiO_2$ | FeO | $SiO_2$ | $Al_2O_3$ | CaO | MgO | MnO | $Cr_2O_3$ | $V_2O_5$ |
|---|---|---|---|---|---|---|---|---|
| 90.60 | 6.35 | 2.07 | 0.60 | 0.18 | 0.63 | 0.24 | 0.16 | 0.32 |

Example 4

The same slag as in Example 1 was broken down by crushing and screened at +106 μm–850 μm. Following this the slag was oxidized in a fluidized bed reactor at 705° C. for 120 minutes in an oxidizing atmosphere comprising a mixture of air and carbon dioxide that set the oxygen level at 4%. Thereafter it was reduced in the same reactor at 750° C. for 20 minutes in a reducing atmosphere comprising chemically pure carbon monoxide. The roasted slag was then leached in boiling 20% hydrochloric acid at atmospheric pressure for 12 hours. At the conclusion of the leach procedure the leach solution was decanted and the solids were washed and dried at 150° C. The composition of the beneficiated titania slag is given in Table 8.

TABLE 8

Composition of beneficiated titania slag in mass percentage

| $TiO_2$ | FeO | $SiO_2$ | $Al_2O_3$ | CaO | MgO | MnO | $Cr_2O_3$ | $V_2O_5$ |
|---|---|---|---|---|---|---|---|---|
| 91.70 | 4.17 | 1.31 | 0.84 | 0.09 | 1.05 | 0.89 | 0.11 | 0.46 |

Example 5

This example will illustrate the inertness of as-cast titania slag to the action of mineral acids. Titania slag with the composition listed in Table 9 was crushed and sized in the range +106 μm–850 μm.

TABLE 9

Chemical composition of titania slag in mass percentage

| $TiO_2$ | FeO | $SiO_2$ | $Al_2O_3$ | CaO | MgO | MnO | $Cr_2O_3$ | $V_2O_5$ |
|---|---|---|---|---|---|---|---|---|
| 87.7 | 10.04 | 1.47 | 1.16 | 0.13 | 0.93 | 1.57 | 0.13 | 0.45 |

This slag was leached in 20 wt % hydrochloric acid at a temperature of 95° C. for 4 hours. Following this the leach liquor was decanted and the solids were dried. The chemical analysis of the leach residue is listed in Table 10.

TABLE 10

Chemical composition of leach residue in mass percentage

| $TiO_2$ | FeO | $SiO_2$ | $Al_2O_3$ | CaO | MgO | MnO | $Cr_2O_3$ | $V_2O_5$ |
|---|---|---|---|---|---|---|---|---|
| 88.40 | 9.08 | 1.26 | 1.08 | 0.10 | 0.98 | 1.56 | 0.11 | 0.44 |

Example 6

Ilmenite from a beach sand deposit was smelted in a DC arc plasma furnace. The composition of the slag that was produced is presented in Table 11.

TABLE 11

Chemical composition of titania slag in mass percentage

| $TiO_2$ | FeO | $SiO_2$ | $Al_2O_3$ | CaO | MgO | MnO | $Cr_2O_3$ | $V_2O_5$ |
|---|---|---|---|---|---|---|---|---|
| 88.70 | 7.92 | 1.64 | 0.99 | 0.31 | 1.42 | 1.32 | 0.15 | 0.41 |

The slag was broken down by crushing and screened at +106 µm–850 µm. Following this the slag was oxidized in a fluidized bed reactor at 850° C. for 3 hours in an oxidizing atmosphere that resulted from the combustion of coal char in an excess of air. Thereafter it was reduced in the same reactor at 800° C. for 30 minutes in a reducing atmosphere that resulted from the combustion of coal in the absence of excess air. The roasted slag was then leached in a pressure vessel at 140° C. in 20 wt % hydrochloric acid for 2 hours. At the conclusion of the leach procedure the leach solution was decanted and the solids were washed and dried at 150° C. The composition of the beneficiated titania slag is given in Table 12.

TABLE 12

Composition of beneficiated titania slag in mass percentage

| $TiO_2$ | FeO | $SiO_2$ | $Al_2O_3$ | CaO | MgO | MnO | $Cr_2O_3$ | $V_2O_5$ |
|---|---|---|---|---|---|---|---|---|
| 94.6 | 1.82 | 2.03 | 0.40 | 0.14 | 0.40 | 0.30 | 0.09 | 0.29 |

It will be appreciated that many variations in detail are possible without thereby departing from the scope and spirit of the invention.

What is claimed is:

1. A method of treating titania slag to increase the leachability of impurities from the slag comprising the steps of:
    sizing the titania slag to a particle size from 75 to 850 µm, wherein the titania slag is produced from beach sand ilmenite;
    oxidizing the sized slag particles in an oxidizing atmosphere at a temperature from about 700° C. to below about 900° C. for at least 30 minutes;
    allowing an anatase phase to stabilize in the slag during the oxidation, allowing the iron present in the slag to concentrate at the exposed surfaces of the slag particles, allowing a major portion of the iron in the Fe(II) state to convert to the Fe(III) state, and allowing the titanium in the Ti(III) state to be converted to the Ti(IV) state; and
    reducing the oxidized slag in a reducing atmosphere from about 700° C. to about 950° C. for at least 5 minutes to convert a major portion of the iron in the Fe(III) state to the Fe(II) state.

2. The method of claim 1 wherein the oxidation is carried out at a temperature from about 750° C. to below about 900° C.

3. The method of claim 2 wherein the oxidation is carried out at a temperature from about 800° C. to about 875° C.

4. The method of any one of the claims 1 to 3 wherein more than 90% of the iron in the Fe(II) state is converted to the Fe(III) state during oxidizing of the slag.

5. A method of beneficiating titania slag to increase the $TiO_2$ content thereof to at least 90% by weight comprising the steps of:
    sizing the titania slag to a particle size from 75 to 850 µm wherein the titania slag is produced from beach sand ilmenite;
    oxidizing the sized slag particles in an oxidizing atmosphere at a temperature from about 700° C. to below about 900° C. for at least 30 minutes,
    allowing an anatase phase to stabilize in the slag during the oxidation, allowing the iron present in the slag to concentrate at the exposed surfaces of the slag particles, allowing a major portion of the iron in the Fe(II) state to convert to the Fe(III) state, and allowing the titanium in the Ti(III) state to be converted to the TI(IV) state;
    reducing the oxidized slag in a reducing atmosphere from about 700° C. to about 950° C. for at least 5 minutes to convert a major portion of the iron in the Fe(III) state to the Fe(II) state; and
    leaching the reduced slag with acid to obtain a beneficiated slag product with an increased $TiO_2$ content and leach liquor containing the leached impurities.

6. The method of claim 5 wherein the leaching is conducted under pressure in excess of atmospheric pressure.

7. The method of claim 5 wherein the leaching is conducted at atmospheric pressure.

8. The method of claim 5 wherein the acid used in the leaching step is heated.

9. The method of claim 5 wherein the acid used in the leaching step comprises hydrochloric acid.

10. The method of claim 5 which includes a caustic leaching step after the acid leaching step.

11. The method of claim 5 which includes a step of calcining the beneficiated slag product.

12. The method of claim 11 wherein the beneficiated slag product is washed and dried to remove volatile by products prior to the calcining step.

13. The method of any one of claims 5 to 12 wherein the oxidation is carried out at a temperature from about 750° C. to below about 900° C.

14. The method of claim 13 wherein the oxidation is carried out at a temperature from about 800° C. to about 875° C.

15. The method of any one of claims 5 to 12 wherein more than 90% of the iron in the Fe(II) state is converted to the Fe(III) state during oxidizing of the slag.

16. The method of claim 1 or 5 wherein substantially none of the titanium in the Ti(IV) state is converted to the Ti(III) state during reduction.

17. A method of treating titania slag to increase the leachability of impurities from the slag comprising the steps of:
    sizing the titania slag to a particle size from 75 to 850 µm;
    oxidizing the sized slag particles in an oxidizing atmosphere at a temperature from about 700° C. to below about 800° C. for at least 30 minutes,
    allowing an anatase phase to stabilize in the slag during the oxidation, allowing the iron present in the slag to concentrate at the exposed surfaces of the slag particles, allowing a major portion of the iron in the Fe(II) state to convert to the Fe(III) state, and allowing the titanium in the Ti(III) state to be converted to the Ti(IV) state; and
    reducing the oxidized slag in a reducing atmosphere from about 700° C. to about 950° C. for at least 5 minutes to convert a major portion of the iron in the Fe(III) state to the Fe(II) state.

18. The method of claim 17 wherein the titania slag is produced from beach sand ilmenite.

19. A method of beneficiating titania slag to increase the $TiO_2$ content thereof to at least 90% by weight comprising the steps of:

sizing the titania slag to a particle size from 75 to 850 μm;

oxidizing the sized slag particles in an oxidizing atmosphere at a temperature from about 700° C. to below about 800° C. for at least 30 minutes, allowing an anatase phase to stabilize in the slag during the oxidation, allowing the iron present in the slag to concentrate at the exposed surfaces of the slag particles, allowing a major portion of the iron in the Fe(II) state to convert to the Fe(III) state, and allowing the titanium in the Ti(II) state to be converted to the TI(IV) state;

reducing the oxidized slag in a reducing atmosphere from about 700° C. to about 950° C. for at least 5 minutes to convert a major portion of the iron in the Fe(III) state to the Fe(III) state; and leaching the reduced slag with acid to obtain a beneficiated slag product with an increased $TiO_2$ content and leach liquor containing the leached impurities.

20. The method of claim 19 wherein the titania slag is produced from beach sand ilmenite.

* * * * *